United States Patent
Syracuse et al.

(10) Patent No.: US 6,776,522 B2
(45) Date of Patent: Aug. 17, 2004

(54) APPARATUS AND SYSTEM FOR MONITORING TEMPERATURE OF HIGH VOLTAGE CONDUCTORS

(76) Inventors: Steven J. Syracuse, 9119 Castlebay, Charlotte, NC (US) 28277; Roy Clark, 3485 Chief Cir., Thousand Oaks, CA (US) 91360

( * ) Notice: Subject to any disclaimer, the term of this patent is extended or adjusted under 35 U.S.C. 154(b) by 0 days.

(21) Appl. No.: 10/267,937

(22) Filed: Oct. 9, 2002

(65) Prior Publication Data

US 2004/0071185 A1 Apr. 15, 2004

(51) Int. Cl.$^7$ .............................. G01J 5/08; G01K 1/02; G01K 1/14; G01K 1/16

(52) U.S. Cl. ........................................ 374/131; 374/120

(58) Field of Search ................................ 374/120, 152, 374/130, 131, 132, 170; 324/96

(56) References Cited

U.S. PATENT DOCUMENTS

| | | | |
|---|---|---|---|
| 4,002,975 A | * | 1/1977 | Erickson et al. .............. 324/96 |
| 4,100,488 A | | 7/1978 | Quietzsch |
| 4,136,566 A | | 1/1979 | Christensen |
| 4,158,810 A | | 6/1979 | Leskovar |
| 4,268,818 A | | 5/1981 | Davis |
| 4,346,478 A | | 8/1982 | Sichling |
| 4,384,289 A | | 5/1983 | Stillwell |
| 5,235,861 A | | 8/1983 | Seppa |
| 4,409,476 A | | 10/1983 | Lofgren |
| 4,437,761 A | | 3/1984 | Kroger |
| 4,575,259 A | | 3/1986 | Bacci |
| 4,613,727 A | | 9/1986 | Salanki |
| 4,635,055 A | | 1/1987 | Fernandes |
| 4,671,651 A | | 6/1987 | Toyoda |
| 4,681,434 A | * | 7/1987 | Kepple .......................... 356/45 |
| 4,689,483 A | | 8/1987 | Weinberger |
| 4,709,339 A | | 11/1987 | Fernandes |
| 4,728,887 A | | 3/1988 | Davis |
| 4,772,090 A | * | 9/1988 | Atkins et al. ................ 385/101 |
| 4,799,005 A | * | 1/1989 | Fernandes ..................... 324/127 |
| 4,801,937 A | | 1/1989 | Fernandes |

(List continued on next page.)

OTHER PUBLICATIONS

Rodenbaugh, Tom, "Cable Temperature Sensor–a Success for SCE," Sep. 1997 Newsletter, Power Delivery Grp, Electrical Power Research Institite, P.O. Box 10412, Palo Alto, CA.

Rodenbaugh, Tom, "Real Time Monitoring & Rating of Transmission Cir," Apr. 1997 Newsletter, Power Delivery Grp, Electrical Power Research Institite, P.O. Box 10412, Palo Alto, CA.

Hrabliuk, James, "Design Options Using Optical Current and Voltage Transducers in a High Voltage Substation," IEEE PES Substation Cmt. Ann. Mtg. May 1, 2000.

*Primary Examiner*—Gail Verbitsky
(74) *Attorney, Agent, or Firm*—Tim L. Burgess

(57) ABSTRACT

Apparatus for monitoring the temperature of a high voltage conductor includes an electrically and thermally conductive fixture for attachment to a high voltage conductor, and a high voltage insulator having a high voltage end and a reference potential end. The insulator is connected at the high voltage end to the fixture. The insulator contains a fiber optic cable in a fiber optic cable passageway from the reference potential end to the high voltage end. The cable extends beyond the insulator. An optical temperature sensor head is optically coupled to the cable the high voltage end. The sensor head includes a sensor crystal which transmits light that varies with temperature of the sensor crystal. An electrically and thermally conductive enclosure enclosing the sensor head is supported in the fixture for thermally conductive contact with the high voltage conductor effective to couple the temperature of the high voltage conductor to the sensor crystal. An optoelectrical unit powers and detects the optic signal carrying the information about the temperature of the high voltage conductor.

31 Claims, 5 Drawing Sheets

U.S. PATENT DOCUMENTS

| | | | |
|---|---|---|---|
| 4,802,731 A | | 2/1989 | Maschek |
| 4,806,855 A | | 2/1989 | Davis |
| 4,818,990 A | | 4/1989 | Fernandes |
| 4,829,298 A | * | 5/1989 | Fernandes .............. 340/870.27 |
| 4,832,442 A | * | 5/1989 | Pappas ....................... 385/102 |
| 4,859,925 A | | 8/1989 | Beling |
| 4,894,785 A | | 1/1990 | Fernandes |
| 4,904,996 A | | 2/1990 | Fernandes |
| 4,988,212 A | * | 1/1991 | Sun et al. ................... 374/161 |
| 5,004,913 A | | 4/1991 | Kleinerman |
| 5,006,846 A | | 4/1991 | Granville |
| 5,012,182 A | * | 4/1991 | Fujiki et al. .................. 324/96 |
| 5,029,101 A | | 7/1991 | Fernandes |
| 5,036,194 A | | 7/1991 | Hazel |
| 5,053,617 A | * | 10/1991 | Kakizaki et al. ....... 250/227.21 |
| 5,062,686 A | | 11/1991 | Barrow |
| 5,140,257 A | | 8/1992 | Davis |
| 5,181,026 A | | 1/1993 | Granville |
| 5,289,720 A | * | 3/1994 | Gualtieri et al. ............... 73/705 |
| 5,290,103 A | | 3/1994 | Fevrier |
| 5,341,088 A | | 8/1994 | Davis |
| 5,366,290 A | * | 11/1994 | Mayer et al. ............... 374/130 |
| 5,517,864 A | | 5/1996 | Seppa |
| 5,594,827 A | | 1/1997 | Joulie |
| 5,775,808 A | * | 7/1998 | Pan ........................... 374/161 |
| 5,918,288 A | | 6/1999 | Seppa |
| 6,167,525 A | | 12/2000 | Donazzi |
| 6,511,222 B1 | * | 1/2003 | Bouamra .................... 374/161 |
| 2002/0159499 A1 | * | 10/2002 | Ruffa ........................ 374/161 |

* cited by examiner

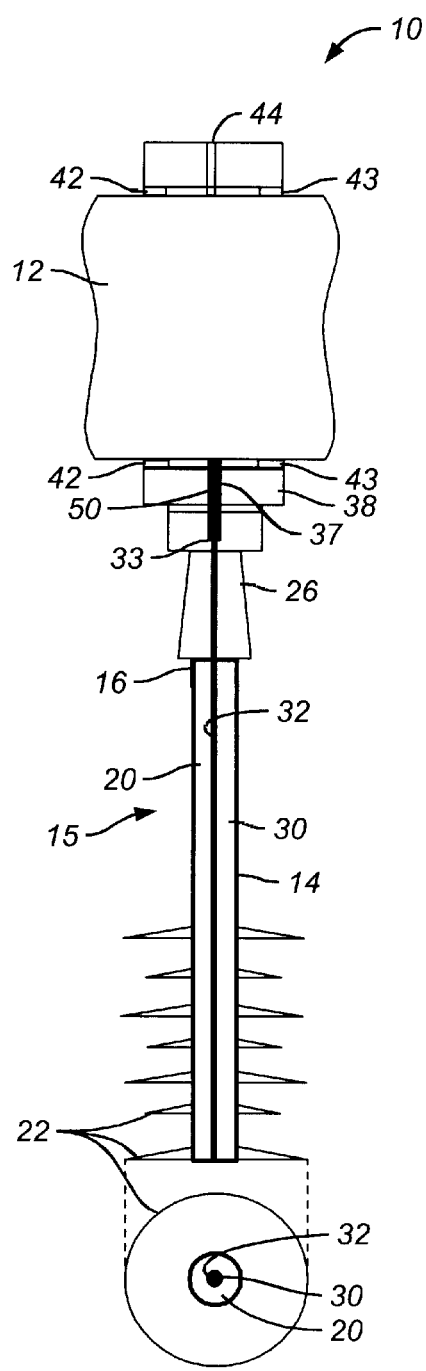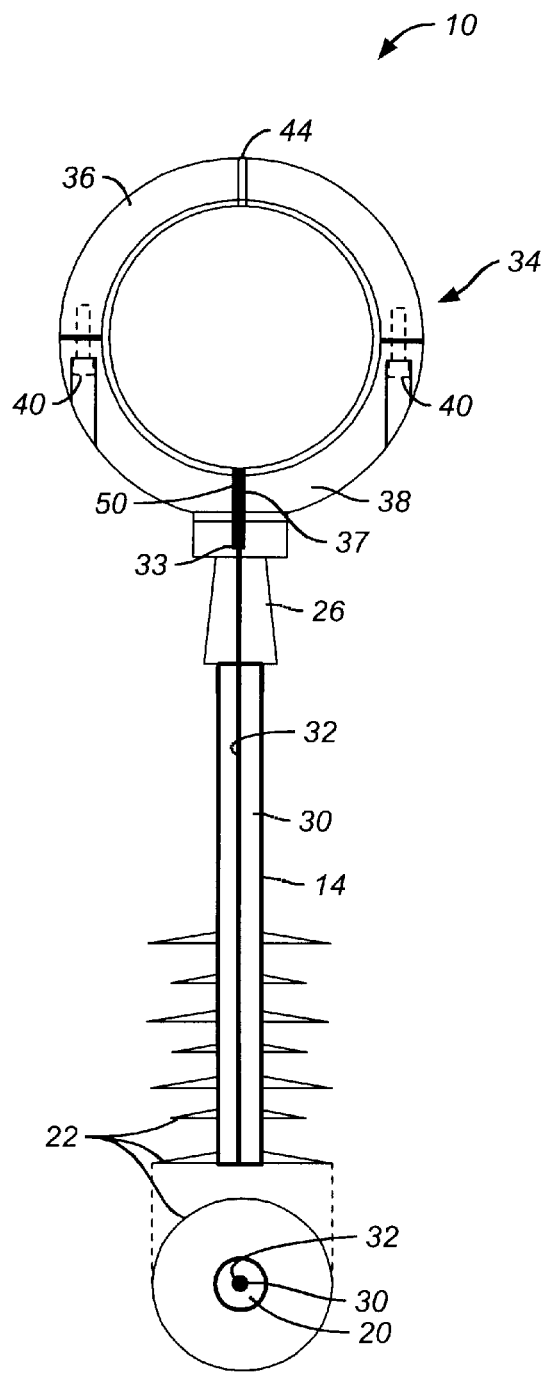
*FIG. 2a*  *FIG. 2b*

APPARATUS AND SYSTEM FOR MONITORING TEMPERATURE OF HIGH VOLTAGE CONDUCTORS

BACKGROUND OF THE INVENTION

This invention relates to apparatus and systems for thermal measurement of high voltage electrical power transmission and distribution lines and related high voltage components and equipment such as occur in substations, and more particularly, to apparatus and systems that make use of contact thermal sensors for determining the temperature of the power lines and associated high voltage components and equipment.

Demand for electric power has grown faster than the capability of the existing distributed power delivery assets to deliver it reliably. Since the mid-1990's, sales of power loaded onto the U.S. power transmission and distribution grids has increased 100-fold. Despite this unprecedented and growing demand for electrical power, erection of new transmission lines in the North America has not kept pace. New construction costs are high and lead times are long. Costs for the construction of new high voltage transmission capacity can range from $1,100,000 to $3,300,000 per circuit-mile. If land acquisition and/or establishment/extension of rights-of-way are involved, lead times can be as long as 4 years or more. Recent industry literature is replete with phrases such as, "construction of new transmission capacity is grinding to a halt." On Jan. 1, 1992, 191,690 circuit-miles of transmission existed in North America. Ten-year plans ending 2002 called for 8.3% additions to transmission capacity through new construction. As of the end of 1998, approximately 30% of these additions had been built; the 207,586 circuit miles seen as required by 2002 had been whittled down to 202,196 circuit-miles, and completion of the additions had been pushed out 5 years to 2007. In 1998, the North American Electric Reliability Council ("NREC"), listed planned transmission additions (230 kV transmission systems and above) through 2007 of 6,588 circuit-miles.

As a result, the electrical power distribution industry is faced with squeezing more current delivery out of existing infrastructure. Utilities are being tasked to operate existing power lines at previously unexplored operating levels for extended periods of time. Transmission systems are being operated in a manner for which control of them was not designed. Blackouts, equipment damage, and system disturbances are becoming widespread, with ever increasing frequency and effect.

Electrical current flowing through a metallic conductor causes $I^2R$ losses in the conductor, that is, heat generation in the conductor changes exponentially with changes in current load. The current/temperature relationship affects not only the high voltage lines but also system equipment, conductors, and components in the power line circuit. This includes buses, switches, cables, transformers, etc. in high voltage transmission and distribution substations. This relationship of conductor temperature to current impacts two factors that limit how much current a given high voltage transmission line can safely and reliably transmit or carry on a continuous basis: firstly, the clearance between the mid-point of the line (at a span between two transmission towers) and the ground beneath the mid-point (or a grounded object, e.g., a tree); secondly, the temperature at which the transmission line begins to undergo irreversible physical (mechanical and/or electrical) changes.

Firstly, metals expand on heating. If too much current passes through a power line, the line may sag so close to the ground that it violates the mandated clearance for such lines. These clearances are regarded as 'deadly serious' by utilities. In some cases, the line may sag far enough to make contact with a grounded object. In such events, blackouts can and do result, and with these come losses: loss of equipment and property, loss of electric service to customers, lost utility revenues, customer manufacturing and product losses, productivity losses, and even loss life. Thus high line temperatures are a limiting factor of how much current a line can safely transfer.

Secondly, if too much current passes through the line, the resulting temperature of the line will cause the aluminum conductor material to anneal. When aluminum anneals, its mechanical and electrical properties change irreversibly; annealed aluminum has higher resistivity and lower mechanical strength than ordinary aluminum. After annealing, electrical transmission losses increase via heat generation, and the amount of sag increases for any given amount of current passing through the conductor. Once a line is annealed, electric power companies generally cut back or limit power flow. The damaged line can bottleneck the entire circuit in which it resides. In some cases, it is necessary to replace the annealed transmission line.

"Ampacity" is current carrying capability expressed in amperes. As a result of the effect of current on temperature and the effect of temperature on metal, manufacturers of high voltage lines, system equipment, conductors, and other components in the power line circuit thermally rate their products according to limiting ampacities. These name plate ratings are based on the characteristics of the materials used in the product and, at least in the case of transmission lines, on limited assumptions of environmental conditions (e.g., 90° C. and a crosswind of 2 feet per second for transmission lines). Power distribution companies may "de-rate" the nameplate value based on the intended use of the product, for example, because of predicted heating of the product by the environment in which it will operate. Environmentally caused heating is founded on historical information and assumptions of conditions such as wind speed and direction, ambient temperature, humidity, barometric pressure and incident solar radiation. Conservative safety factors (e.g., hottest day, little or no wind, etc.) are applied to reach the rating. Power distribution companies operate their equipment within the name plate ampacity ratings of the manufacturers to prevent the annealing and line sag problems mentioned. To do this, power companies measure current to indirectly gain a reading of percentage of name plate ampacity that a given power load represents.

The ampacity of a power line varies according to the temperature component of the line imposed by actual environmental conditions under which a power line circuit is operating. More current can be transferred through a circuit when the lines are colder than when they are hotter. In order to transfer more current through existing lines without blackouts or system disturbances, power companies need to know in real time as conditions change, moment to moment, at any time, day or night, the dynamic actual ampacity of its equipment, not the static name plate ampacity predictively rated by the manufacturer. Knowing the dynamic actual ampacities, power loads can be safely, accurately, and reliably increased and adjusted within the real time current carrying capabilities of the power distribution system. As a result, the true capacity of the system at the moment can be utilized to safely and reliably deliver more power to customers than present static ratings and operational control methods allow.

Dynamic actual ampacity can be determined by knowledge of actual moment to moment temperatures of the power line. In addition, by knowing actual equipment operating temperatures, substations can be operated and protected optimally based on the thermal state and history of equipment. Substation equipment is routinely tripped (i.e., taken off line in order to protect it) based on information from current sensors, without regard to actual equipment operating temperature. In many instances, such equipment is operating safely, from a thermal standpoint, and is not in danger of undergoing thermal damage. Continuous temperature monitoring allows such equipment to continue operating safely.

In earlier years, in order to monitor power line sag, a number of diverse technologies were developed to monitor line temperatures directly or indirectly. Early methods provided electrical devices mounted on or nearby or moved along the power lines. Various thermocouple, resistance temperature monitors (RTD's), thermistor, solid state or other electromechanical transducer systems were suggested, typically employing radio frequency or other transmittal of sensed information, as represented by U.S. Pat. Nos. 4,268,818, 4,384,289; 4,635,055; 4,709,339; 4,728,887; 4,801,937; 4,806,855; 4,818,990, 4,894,785, 4,904,996; 5,006,846; 5,029,101; 5,140,257; and 5,181,026; or a fiber optic link as in U.S. Pat. Nos. 4,859,925 and 5,341,088. High voltage insulators have been developed containing fiber optics to link these traditional methods of measurement, as in U.S. Pat. Nos. 4,613,727; 4,802,731; and 5,594,827. These traditional methods of measuring temperature (thermocouples and thermistors) are not safe, accurate or reliable in the extremely high voltage environment. Susceptibility to intense electric fields in the high voltage environment inevitably results in damage and catastrophic failure of electronic sensors such as thermocouples and thermistors.

Other methods, such as capturing an image of the line relative to the ground, and then using software to analyze the image for clearance, have been used to estimate the sag in a line. Alternatively, line tension monitors have been used to calculate sag, but installation requirements do not allow tension to be determined at every location; only certain spans can support a tension monitor. As a result, line tension is frequently determined for a span that is actually not the thermally limiting span, or it is determined so far from the thermally limiting span as to be of limited use insofar as the dynamic rating of the whole circuit is concerned.

Optical fibers, due to dielectric construction, are free from electrical interference, and use of them as an intrinsic sensor has been made or suggested for sensing power line temperatures. A segment of the fiber serves as a sensor gauge while a long length of the same or another fiber conveys the sensed information to a remote station where the sensed information is decoded with reflectometric or interferometric technologies and used by computers to calculate temperatures. One such system using optical time domain reflectometry and measuring Raman backscatter as a temperature sensing principle is described in U.S. Pat. No. 6,167,525. Alternatively to Raman backscattering, the detection of changes in phase of light emerging from a single mode optical fiber has been employed for current and voltage control in high power cables, using interferometric schemes (Mach-Zehnder, Michelson, Fabry-Perot or Sagnac forms). The Raman backscattering and interferometric techniques, while offering good sensitivity and accuracy, are quite complicated and costly in terms of procurement, installation, operation, maintenance, and repair.

Another kind of temperature sensor using optical fibers is an extrinsic sensor in which the temperature sensitive elements are distinct from the optical fiber itself. These type sensors basically fall into two groups: pyrometeric sensors used to remotely detect infrared radiations emitted from hot bodies, and contact sensors which rely on conductive heat transfer. Examples of extrinsic contact sensors are described in U.S. Pat. Nos. 4,409,476; 4,437,761; 4,575,259; 4,671,651; 4,689,483; 5,004,913; 5,036,194 and 5,062,686. The typical suggested applications for extrinsic contact sensors are aerospace, chemical process and other life intolerant environments.

A simple, direct reading of a conductor temperature is a more accurate and relevant operating or condition parameter for determining ampacity than current load (i.e., amperes). A current overloaded object fails because of thermal damage, not because of current, per se. An accurate real time measure of temperature of components of electrical power distribution systems will give electric power companies the ability to have real time dynamic ampacity ratings of their systems.

BRIEF SUMMARY OF THE INVENTION

It is a goal of this invention to provide accurate, continuous, real-time temperature monitoring of critical electrical power transmission system components and equipment.

It is an object of this invention to enable dynamic thermal circuit rating and operation of electrical power transmission lines and systems.

It is an object of this invention to enable temperature monitoring of existing transmission system assets (equipment, components, conductors, substations, etc.) to allow safe and reliable operation at higher-than-statically-rated amperages.

In accordance with this invention, apparatus and systems are provided for inexpensively and reliably monitoring and detecting in real time the actual temperature of a high voltage conductor, unaffected by the electric field of the conductor, and for reporting such actual temperatures. From knowledge of this temperature, high voltage power lines can be operated more confidently to employ all the current carrying capacity of the power line within maximum safe limits.

As used in this invention, the term "conductor" includes any electrically conductive component in an electric power transmission and distribution system, and includes transmission lines and components and equipment in substations.

The invention for monitoring actual operating temperatures of high voltage conductors comprises a novel combination of (i) an electrically and thermally conductive fixture for attachment to a high voltage conductor, (ii) a high voltage insulator having a high voltage end and a reference potential end and a fiber optic cable passageway from the reference potential end to the high voltage end, the insulator being connected at the high voltage end to the fixture, (iii) a fiber optic cable within the passageway of the insulator, the cable extending beyond the insulator, (iv) an optical temperature sensor head optically coupled to the fiber optic cable, the sensor head comprising a sensor crystal which transmits light that varies with temperature of the sensor crystal, and (v) an electrically and thermally conductive enclosure for the sensor head, supported in the fixture for thermally conductive contact with the high voltage conductor effective to couple the temperature of the high voltage conductor to the sensor crystal.

The apparatus of this invention allows extrinsic sensors optically coupled to optical fibers to be reliably used for contact thermal measurement of high voltage conductors despite the extremely high strength electric field that is generated by electric current as it flows through high voltage conductors.

Typically, extrinsic fiber optic contact temperature sensors in various other applications are constructed of all (or mostly all) dielectric insulating materials. Extension of this construction experience to a high voltage electric field environment is intuitively logical, since intrinsic sensor systems rely on the dielectric characteristics of optical fiber for determination of temperature in this environment. However, sensors constructed of dielectric insulating materials almost certainly will fail due to electric field induced damage if placed in contact with or in proximity to a high voltage conductor. If sensor components, whatever they are, are housed in a polymer, glass, ceramic or other dielectric insulator, the presence of even one tiny air gap, micro-bubble, void, point of humidity ingress, or other like flaw, will become a hot-spot in the high voltage electric field due to electrically induced breakdown and will eventually cause the sensor to fail.

The present invention avoids this high risk mode of failure from intense electric fields in the presence of high voltage conductors, surprisingly, by employing in the novel combination described above, an electrically conductive casing for the sensor head. Because electric fields cannot penetrate closed electrical conductors, the enclosed sensor heads components cannot be affected by the powerful and inexorable degenerative effects of the extremely high strength electric field that is generated by electric current as it flows through high voltage conductors. For the casing to be an electrical conductor, the casing is metallic. The casing preferably is aluminum, which among non-exotic metals is bested in thermal conductivity only by copper, but does not set up a galvanic reaction with the most commonly employed high voltage conductor materials to the extent that copper does. The metallic casing has the advantages of very small thermal mass and very low thermal impedance.

The novel combination of fixture, insulator, one or more optical fibers, sensor head and the enclosure encasing the sensor head described above preferably is combined in a unitary structure embodiment, that is, the elements of the combination are unitized in one "monolithic" ready-to-install structure, which, for brevity of reference hereinafter is sometimes called the "unitary structure". The unitary structure allows easy and rapid attachment to conductors, and holds the sensor head and insulator in rigid and intimate thermal, physical, and electrical contact with the conductor to be monitored. The fixture also shields the sensor head from dynamic external environmental effects (sunlight, precipitation/humidity, wind, ambient temperature) that could effect the temperature reading. The fixture is tailored to the size, type, and voltage class of the conductor type to be monitored. The unitary structure can be attached to conductors ranging in size and type, for example, from six inch aluminum buses in transmission substations to three-fourths inch diameter high voltage transmission line cables. As the specified operating voltage changes, the length of the insulator and necessary length of optical fiber used is changed accordingly. The one or more optical fibers sealed and supported by the insulator may be one optical fiber, two optical fibers, or an array of fibers in a fiber optic cable. Preferably standard, multi-mode, all-dielectric optical fiber is used. The fiber is very rugged, and provides for high reliability trouble-free installation and operation.

The sensor head of the invention and the unitary structure embodiment comprises a sensor crystal that transmits light that varies as the temperature of the sensor crystal changes, and optionally includes with some crystals a reflector arranged adjacent the sensor crystal distally to the one or more optical fibers, for reflecting light back through the sensor crystal. The sensor crystal may be one of several types. It may be one which shifts the wavelength of light passing through it with changing temperature, or one which modulates the intensity of transmitted light according to a change in temperature of the sensor, or one having material that absorbs incident light and produces a luminescence of wavelength that changes according to the temperature of the sensor. The luminescence may be fluorescent or phosphorescent. Preferably a fluorescence crystal comprises a chromium doped beryllium aluminum oxide or chromium doped yttrium oxide single crystal material, such as Alexandrite. Where the sensor crystal modulates the intensity of transmitted light according to a change in temperature of the sensor, the sensor crystal preferably has an absorption band edge that is temperature sensitive in the range from about −80° C. to about 200° C.

The sensor head suitably further comprises a gradient index lens (GRIN lens) having a focal plane parallel to and contacting the end face of the one or more optical fibers extending from the high voltage side of the insulator, with another focal plane parallel to and contacting the sensor crystal.

The sensing element of the foregoing apparatus of this invention expresses its optical message suitably with light from a source radiating light through the one or more optical fibers. The kind and power of the light source affects the sensitivity of the sensor and allows it to measure temperatures over a selected temperature range. If it is unnecessary to measure temperature with high resolution, accuracy and precision over a large temperature range, the light source may be an incandescent lamp with a band pass filter or a light emitting diode. If it is desirable to measure temperature over a large range with high resolution, accuracy and precision, coherent light producing a narrow bandwidth is preferred. In such event, the light source advantageously is a diode laser that launches light in the near infrared spectrum, particularly a diode laser that has a coupling output of at least about 20 decibels above 1 milliwatt, that is, at least about 100 milliwatts. When used with a luminescent sensor crystal, a Q switched laser diode is suitably employed. Employing a light attenuating absorption edge optical sensor that is temperature sensitive in the range from about 0° to about 200° C. powered by a laser diode, temperature detection with a resolution of 0.5° C., at an accuracy of 1° C. and precision of 1° C. over a range of 0–160° C. is possible.

A detector is optically coupled to an optical fiber carrying said return light from the sensor. The coupling is at an end of the fiber optic cable remote from where the cable exits the insulator member of the apparatus. The detector receives and converts the optical information in the return light into information in another form, for example, voltage, representative of the temperature of said high voltage conductor.

For example, the temperature of the high voltage conductor to which the sensor head is fixed may be detected by employing a photodetector such as a photodiode for detecting the return light and converting it to electrical values which, if analog, are then converted to digital values and processed by a computer against calibration curves data which correlates to the temperature of the sensor. Alternatively, a spectrometer may be used in the case of wavelength shift crystals such as GaAs and the position of the absorption shift analyzed and correlated back to temperature. Or an optical comparator may be employed for comparing intensity of the light from the light source with intensity of the optical radiation radiated by the sensor crystal to produce a result of the comparison, and a converter for converting the result into a representation of sensed temperature of the high voltage conductor.

A data processor suitably receives and processes the information from the detector to determine the temperature sensed by the sensor crystal. The processor communicates with machine readable data storage to which the data of temperature determined by the data processor are written and read, and one or more human readable output devices such as a printer or display monitor is accessed by the processor to report data of temperature determined by the data processor.

BRIEF DESCRIPTION OF THE DRAWINGS

FIG. 2a is a side sectional view end of a unitary high voltage conductor temperature monitoring apparatus of this invention, with a bottom view of an insulator portion of the apparatus projected (by dashed line) below the side sectional view.

FIG. 2b is an end sectional view of apparatus of FIG. 2a, showing a bottom view of an insulator portion of the apparatus projected (by dashed line) below the end sectional view.

FIG. 4b is a schematical side section view of a sensor head employed in the sensor head of the temperature monitoring apparatus of FIG. 4a.

FIG. 4c is a cross sectional view along the lines 4c—4c of FIG. 4a.

DETAILED DESCRIPTION OF THE INVENTION

Figure 1:
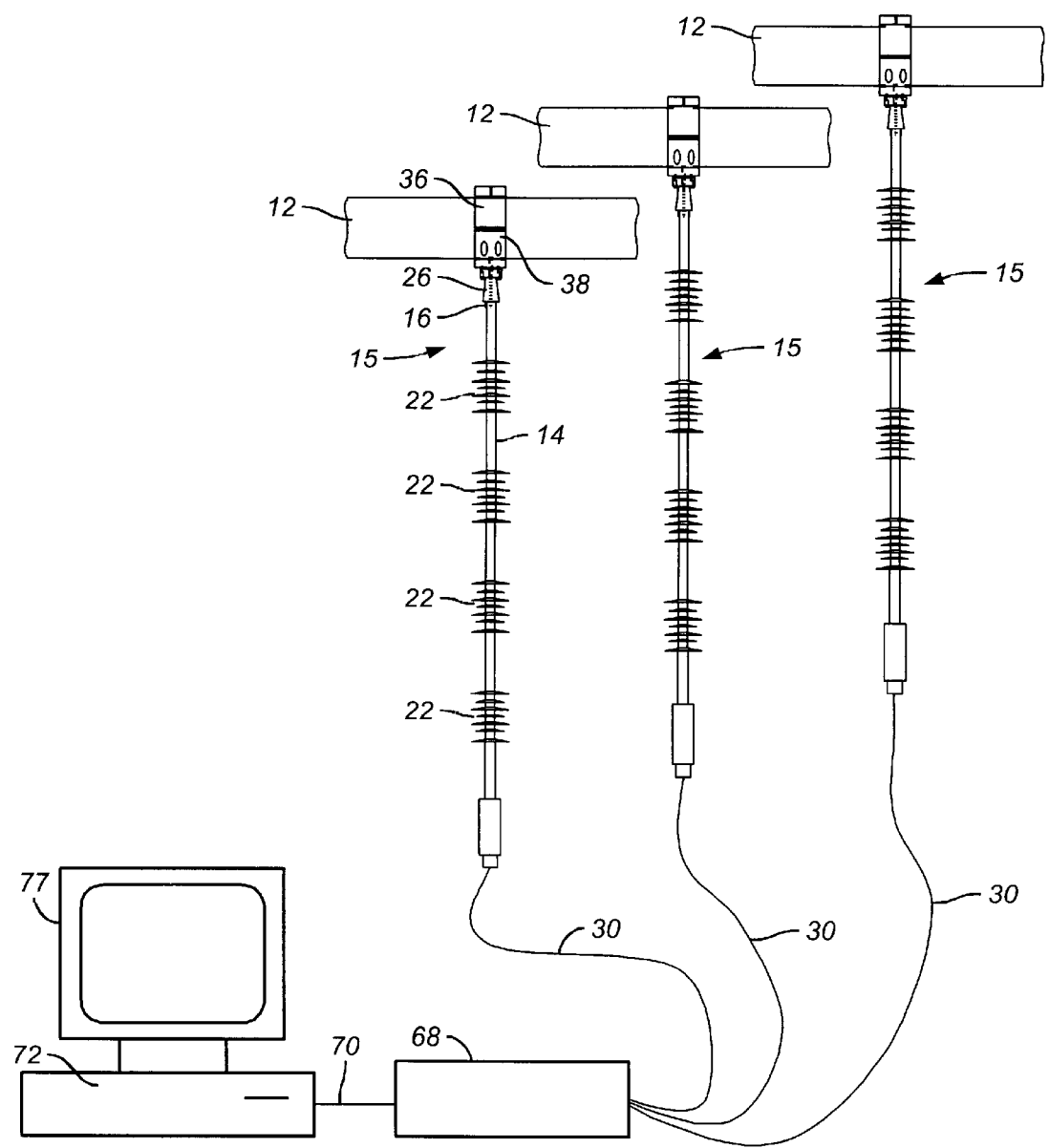
FIG. 1 in depicts a system for monitoring and detecting temperatures of a plurality of high voltage conductors.

Referring to FIGS. 1, 2a and 2b, reference numeral 10 indicates a unitary insulator monitor apparatus for detecting the temperature of a high voltage conductor 12. By high voltage is meant a voltage in excess of 1 kV, for example in excess of 8 kV and upwards, typically 15 kV or 25 kV, even to levels of 134 kV and higher. The term "insulator" is to be understood as including not only an electrical component that is made substantially entirely of insulating material, but also a component, such as a surge arrester, that, while having an insulating outer surface, at some stage of its operation may become conductive.

Apparatus 10 comprises a high voltage insulator assembly indicated generally at 15 in FIG. 1 having a high voltage end 16 and a reference potential end 18. Insulator assembly 15 is constructed of one or more elongate units 14 of a generally cylindrical insulating core or rod 20 and a plurality of circular insulating watersheds 22 integral therewith and extending radially therefrom and circumferentially therearound. The core rod 20 is cemented and/or mechanically secured to metal fitting 26 at the high voltage end 16 and a metal end fitting 28 at reference potential end 18. The metal end fittings provide mechanical connection to the insulator. The watersheds 22 increase the creepage path length end-to-end between the conductive terminals 26 and 28 of the insulator assembly 14 and deflect, or shed, water and other electrically conductive contaminants therefrom, as well known for those skilled in the art. The length and diameter of the insulator rod 20, the number of units 14, and the number and diameter of the sheds 22 of each unit 14 are chosen in dependence on the operating voltage of the insulator and on its operating environment, those parameters increasing the higher the operating voltage and the more severe the operating environment, in terms of pollution due to water, acids, and salts for example, as known in the art.

Insulator rod 20 has a fiber optic cable passageway 32 extending from reference potential end 18 to high voltage end 16. A fiber optic cable 30 passes within passageway 32 of insulator rod 20 from outside passageway 32 at the reference potential end 18 of insulator assembly 15 (see FIG. 1). In the embodiment depicted, insulator rod 20 and end fittings 26, 28 contain an axial passage 32. A portion of a length of optic fiber cable 30 threads through passage 32. Alternatively, rod 20 may contain a groove suitably spiral formed on its exterior surface and fiber cable 30 may be routed in the groove between end fittings 26, 28 and protectively covered exteriorly by a suitable sealant. See for example, U.S. Pat. No. 5,594,827. Both a passageway through the body of rod 20 and a sealed groove along the exterior of rod 20 are intended included by the term "passageway."

Insulator assembly 15 is connected to high voltage conductor 12 by an electrically and thermally conductive "clam shell" fixture or assembly 34. Clam shell assemblies 34 are well known for those skilled in the art, and comprise upper and lower half-rings, 36 and 38 held together by screws 40. Flanges 42, 43 along the inner annulus of the rings contact conductor 12. A clamping screw 44 in upper half-ring 36 is used hold clam shell fixture 34 firmly in place on conductor 12.

Upper or high voltage end fitting 26 of insulator unit 14 suitably is a collar that connects clam shell fixture 34 to insulator rod 20 of the uppermost insulator unit 14 of insulator assembly 15. The passage 32 in upper end fitting 26 is enlarged at well 33 to accept a distal portion of a sensor head 50. Lower ring 38 has a bore 37 penetrating it from top to bottom at the base of the ring. A proximal portion of sensor head 50 is received within bore 37. The enlarged passage 33 of upper end fitting 26 is not deep enough to accept the distal end of sensor head 50 sufficiently to allow the proximal portion of sensor head 50 to reside entirely within bore 37, and is coordinated with the distance between the inner and outer radii of flanges 42, 43 to cause the most proximal portions of sensor head 50 to project above the inner radius of lower ring 38 for firm contact with conductor 12 when rings 36, 38 are fastened together and clamping screw 44 is tightened to fix fixture 34 onto conductor 12. A helical spring may be seated in bore 33 to press against the distal end of sensor head 50 to assure that proximal end 62 of sensor head 50 is held tightly against conductor 12. The proximal end 62 of metal enclosure 60 of sensor head 50 is in contact with conductor 12, and metal enclosure 60 in bore 37 is in contact with the metal that makes up fixture half-ring 38, so conductor 12, enclosure 60 and fixture 34 are all at the same voltage potential.

The half rings 36 and 38 do not make contact with conductor 12 along their entire length. As best seen in FIG. 2a, conductor contact is made only by the rings 36, 38 at inner flanges 42, 43, leaving a non-contact annulus 45. Gaskets 45, 46, suitably of silicon manufacture, are located adjacent flanges 42, 43 to keep rain and other contaminants from entering annulus 45 and to prevent wind drafts from producing convective cooling. This arrangement of claim shell rings 36, 38 fully encloses and protects from the external environment the contact interface of sensor head 50 with conductor 12.

Figure 4A:
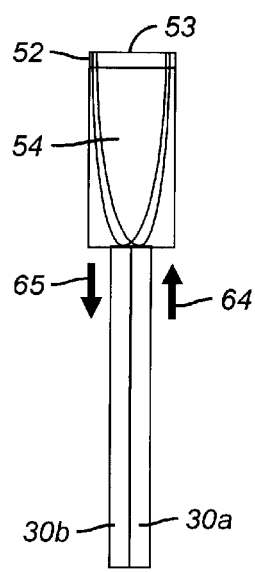
FIG. 4a is a schematic side sectional view of optically coupled components of an enclosed sensor head of the temperature monitoring apparatus of FIGS. 2a and 2b.
Figure 4B:
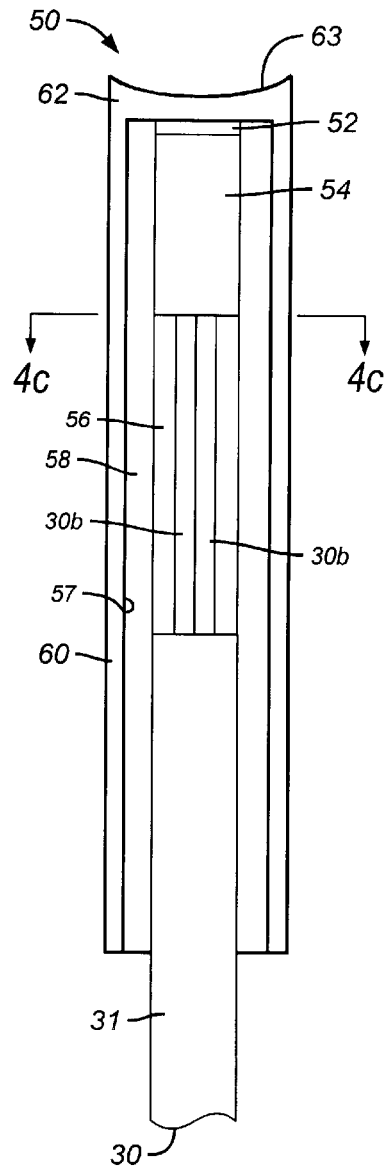
Figure 4C:
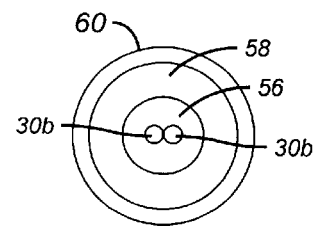

In accordance with the invention, optical temperature sensor head 50 is optically coupled to fiber optic cable 30. Sensor head 50 comprises a sensor crystal 52 which transmits light that varies with the temperature of the sensor crystal. Referring now to FIGS. 4a, 4b and 4c, in the described embodiment sensor crystal 52 is bonded to a gradient index ("GRIN") lens rod 54. Two optic fibers 30a, 30b are bonded to GRIN rod 54 using a ferrule 56. Optic fibers 30a, 30b are encased in a jacket 31 and make up cable 30 that threads through passage 32 of each insulator unit 14 in insulator assembly 15, exiting insulator assembly 15 adjacent reference potential end 18. Ferrule 56 is configured to maintain fibers 30a, 30b equidistant from the optical axis of GRIN lens rod 54, as shown in FIG. 4c. A cylindrical sleeve 58 encircles and supports sensor crystal 52, GRIN lens rod 54, optic fibers 30a, 30b, cable 30 and ferrule 56.

An electrically and thermally conductive enclosure 60 for sensor head 50 surrounds cylindrical sleeve 58, which resides within an annulus 57 between the outer diameters of sensor crystal 52, GRIN lens rod 54, cable 30 and ferrule 56 and the inner diameter of cylindrical enclosure tube 60, and encloses sensor head 50 at a proximal end 62 of enclosure 60 that has a contoured end surface 63 to maximize contact surface area for improving thermal contact to circular conductor 12.

As diagrammatically depicted in FIG. 4a, light from the input fiber 30a (indicated by arrow 64) is collimated by GRIN rod 54. The collimated light then passes through sensor crystal 52 and is reflected from the rear surface 53 of sensor crystal 52 to return through the body of sensor crystal 52 and then through GRIN lens rod 54. The temperature of high voltage conductor 12 is thermally transmitted by metallic enclosure 60 to sensor crystal 52 and affects the light transmitting behavior of sensor crystal 52. Suitably, sensor crystal 52 may be a crystal which, as temperature changes, shifts its transmission spectrum to different wavelengths (i.e., light that is not absorbed); for example, but not by way of limitation, it can be a gallium arsenide or silicon crystal. GaAs and Si crystals are advantageous in that the spectral shift properties of such crystals are well established. Since one is concerned only with absorption shift, signal intensity or attenuation is not of material concern. Alternatively, sensor crystal 52 may be selected to modulate intensity of light transmission in variance to temperature of element 52. Further alternatively, sensor crystal 52 may comprise a material that absorbs incident light from fiber 30a and produces a luminescence of wavelength that changes according to the temperature of sensor crystal 52, for example, but not by way of limitation, sensor crystal 52 may be a chromium doped beryllium aluminum oxide or chromium doped yttrium oxide crystal material and the luminescence may be fluorescence, as in Alexandrite crystals.

The optical signal emerging from the body of sensor crystal 52 now including a representation of the temperature of conductor 12, is focused by GRIN rod 54 into output fiber 30b in the return direction indicated by arrow 65.

Apparatus 10 suitably is monolithic, that is, it comprises the components described above as a single sealed unit.

Referring back to FIG. 1, a temperature monitoring, detecting and reporting system comprises a plurality of insulator monitor apparatuses 10 for detecting the temperature of a high voltage conductor 12 connected, for example, to different segments of a high voltage power line 12. Each of apparatus units 10 is connected by a fiber optic cable 30 to an optoelectronics module 68. Three cables 30 are shown. In the depicted embodiment, typically up to eight apparatus units 10 with eight optical cables may be operated from a single optoelectronics module 68. Optoelectronics module 68 generates the optical signal 64 that is sent to sensor crystal 52 inside apparatus unit 10. The return optical signal 65 containing the temperature information about conductor 12 is detected at optoelectronics module 68 and converted into an electronic signal. The electronic signals are carried over a multi-wire cable 70 to a data processing computer 72. Data processing computer 72 may have the capability to interface with more than one optoelectronics modules 68.

Figure 5:
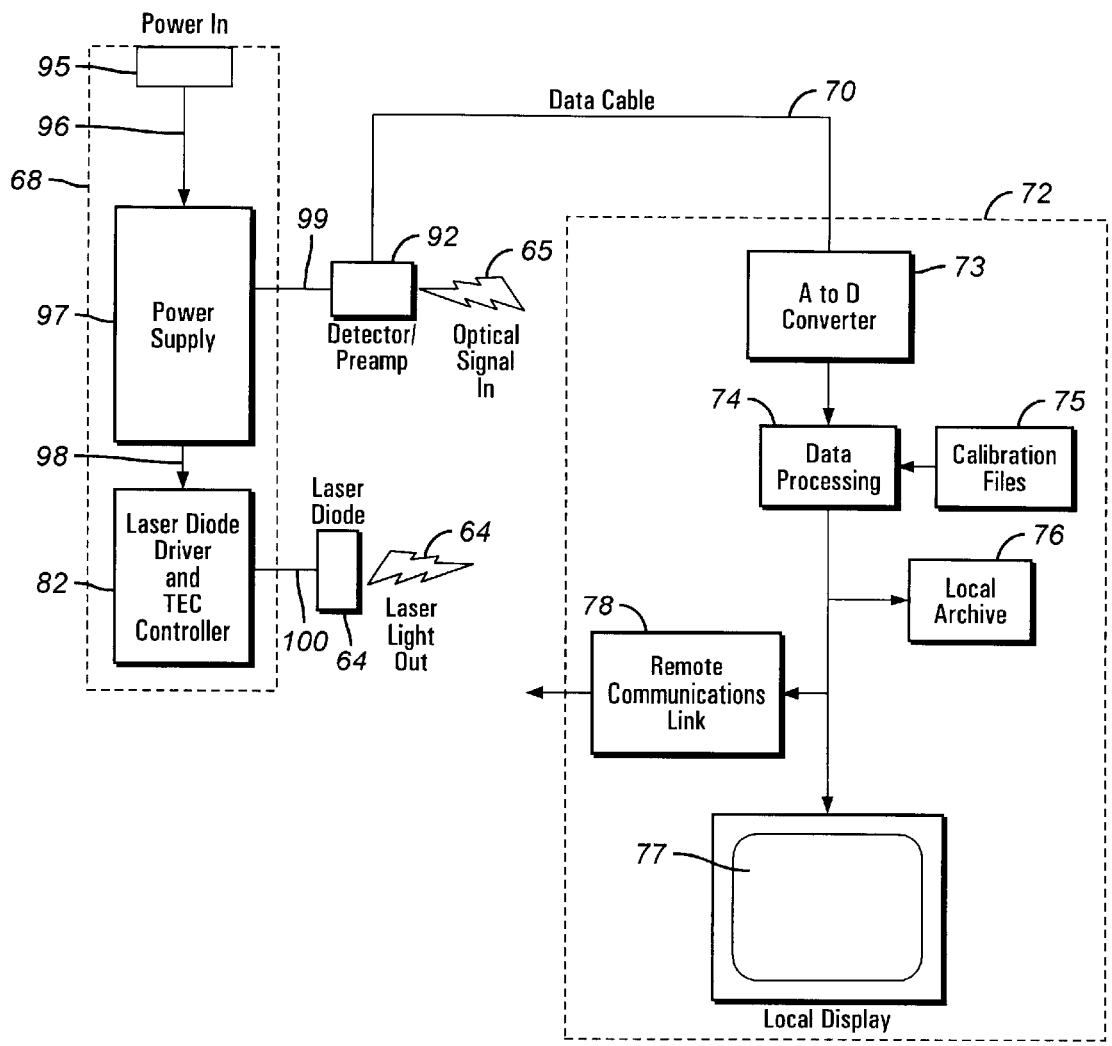
FIG. 5 depicts major components of a system for detecting and reporting temperatures sensed by the apparatus of FIGS. 2a and 2b.

Referring to FIG. 5, the electronic signal carried by data cable 70 passes to an analog to digital converter 73 in computer 72. Digital signal data processing computer 72 processes the digital signals at 74 using calibration data files 75, archives the processed data in storage 76, displays at monitor 77 the processed data locally, and may communicate the data to, and receive communications from, a distant control center over a communications link 78.

Figure 3:
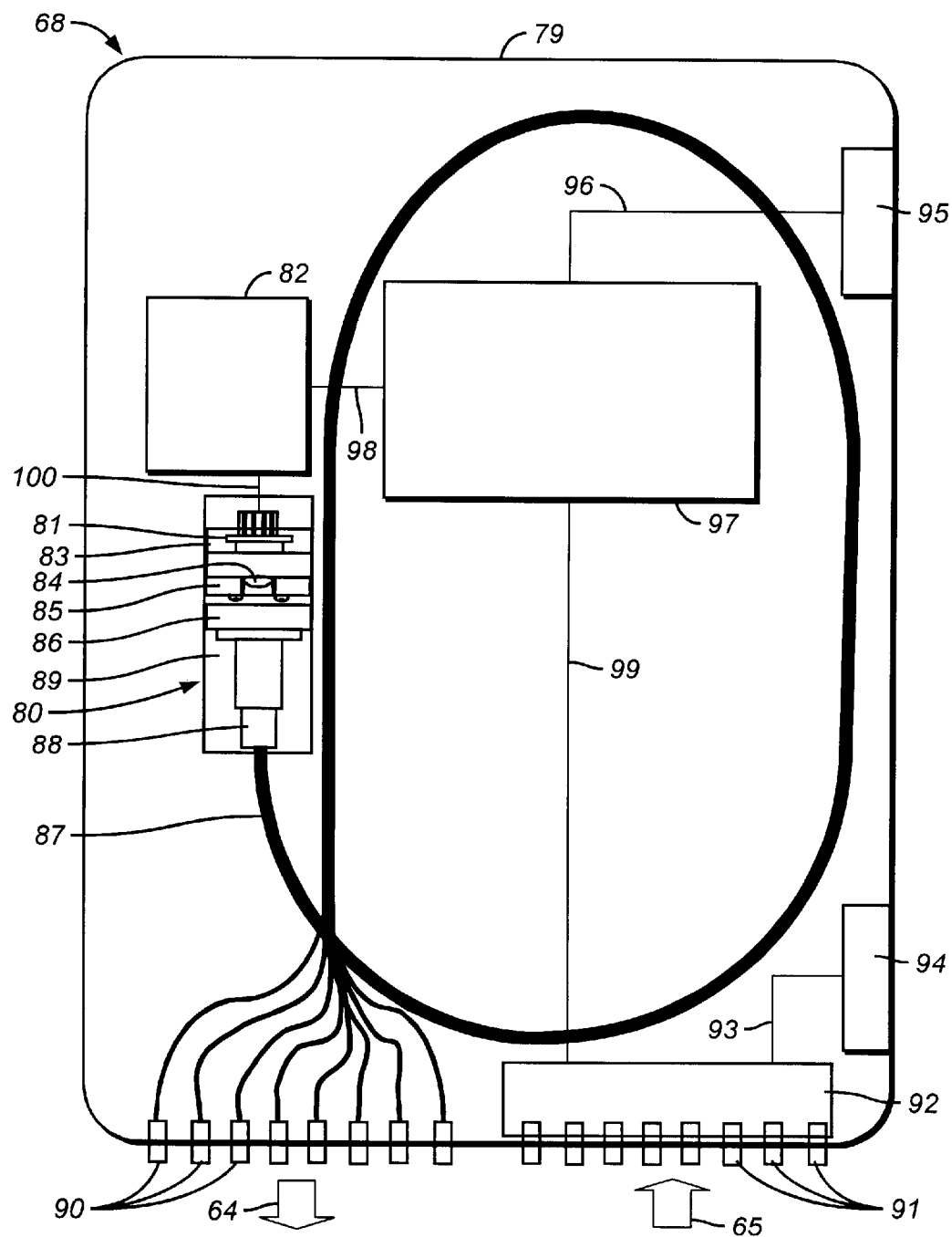
FIG. 3 depicts in top view an optoelectronic detection component of the system of FIG. 1.

FIG. 5 also depicts in block diagram the major components of optoelectronics module 68. FIG. 3 depicts optoelectronics module 68 in greater detail. Referring to FIG. 3, optoelectronics module 68 comprises a light source assembly 80 within an enclosure 79. Light source assembly 80 comprises a laser diode 81 driven by a driver, and cooled using an integral thermoelectric cooler. The laser diode driver and TEC controller are represented at 82 in FIGS. 3 and 5. Laser diode 81 is installed in a first optical mount 83. A lens 84 inside a threaded tube is contained in an adjustable (x-y) second optical mount 85. A third optical mount 86 holds the end of an optical fiber bundle 87. Fiber bundle 87 is terminated in a cylindrical ferrule 88, which may be rotated inside third optical mount 86. All three optical mounts 83, 85, 86 are attached to a common base plate 89. This allows light source assembly 80 to be pre-aligned prior to installation in optoelectronics module 68. A small fiber optic cable/detector (not shown) may also be included in the source assembly to monitor the laser diode intensity.

The fiber optic bundle 87 depicted in FIG. 3 contains eight individual fiber optic cables. These are separated and connected to bulkhead feed-throughs 90 that allow the external cables 30 to sensor head 50 to be connected outside enclosure 79. A suitable area is provided inside enclosure 79 to accommodate the bend radius of fiber optic bundle 87. The return optical signals 65 in the eight fibers 30b of the arrayed units 10 are coupled to receptacle assemblies 91. Integrated circuit board 92 contains combined photodetector and preamplifier components that convert the return optical signals into electrical signals. Such units are well known to those skilled in the art and are commercially available, for example, from Hamamatsu Corporation, 360 Foothill Rd., Bridgewater, N.J. 08807. The electrical signals are amplified on board 92 are conveyed by conductor 93 from board 92 to a multi-pin connector 94, from which the electrical signals are passed by data cable 70 to computer 72. Other signal processing electronics may also be mounted on board 92. Electrical power to the unit is provided at connector 95. This is fed by conductor 96 to power supply 97 that provides the correct electrical power by conductor 98 to laser diode driver/TEC controller 82, by conductor 99 to preamplifiers 92, and by conductor 100 to laser diode 81.

Very substantial benefits are realizable from this invention. By providing accurate, real-time temperature monitoring of critical transmission system components and equipment, the present invention facilitates extension of the useful lifetimes of existing transmission system assets. Existing lines/systems/equipment can continue to be used to serve growing consumer demand, and the costs and efforts of system upgrades and/or new construction can reduced or deferred.

The present invention, by enabling accurate, real-time temperature monitoring of critical transmission system components and equipment, when coupled with use of existing current monitors, will permit current and temperature to be used in combination to protect expensive and/or operationally critical system equipment from thermal damage, while, at the same time, maximizing use of actual ampacity, optimizing system use, and maximizing or extending useful system lifetime. Additionally, continuous temperature monitoring could reduce the frequency of labor and time intensive required routine, periodic inspections, would gather equipment thermal history, enable predictive analysis (end-of-life or remaining life estimates), detect and warn of incipient or imminent failure, and allow indicated maintenance or repair to be scheduled more intelligently and cost effectively. Just-in-time maintenance could be implemented, without compromising safety or reliability.

In summary, real-time temperature monitoring of critical transmission system components, including transmission line and substation components and equipment, in accordance with this invention will enable power companies to improve reliability and safely move more power over their existing systems than is presently allowable. As a direct result, more demand can be satisfied with existing assets, operating revenues could be increased, some demand-driven new construction and/or upgrade costs and efforts could be deferred, and, at the same time, transmission system operational safety, reliability, and power transfer capability would be improved.

What is claimed is:

1. Apparatus for monitoring the temperature of a high voltage conductor, which comprises:
    a) an electrically and thermally conductive fixture for attachment to a high voltage conductor,
    b) a high voltage insulator having a high voltage end and a reference potential end and a fiber optic cable passageway from the reference potential end to the high voltage end, said insulator being connected at said high voltage end to said fixture,
    c) a fiber optic cable within said passageway of said insulator, said cable extending beyond said insulator,
    d) an optical temperature sensor head optically coupled to said cable, said sensor head comprising a sensor crystal which transmits light that varies with temperature of the sensor crystal,
    e) an electrically and thermally conductive enclosure for said sensor head, supported in said fixture for thermally conductive contact with said high voltage conductor effective to couple the temperature of the high voltage conductor to said sensor crystal.

2. The apparatus of claim 1 in which said fixture, said insulator, a length of said fiber optic cable, and said enclosure containing said sensor head are a unitary structure.

3. The apparatus of claim 1 in which said sensor crystal shifts wavelengths of light passing through it in variance to temperature of the sensor crystal.

4. The apparatus of claim 3 in which said sensor crystal shifts light passing through it to higher wavelengths with increasing temperature of the sensor crystal.

5. The apparatus of claim 1 in which said sensor crystal modulates intensity of light transmission in variance to temperature of the sensor crystal.

6. The apparatus of claim 1 in which said sensor head further comprises a gradient index lens having a focal plane parallel to and contacting said sensor crystal and another focal plane parallel to and contacting an end face of said at least one optical fiber within said enclosure.

7. The apparatus of claim 6 in which said sensor head includes a reflective surface distal to said focal plane of said gradient index lens parallel to and contacting said sensor crystal, for reflecting incident light received in said sensor crystal back into said gradient index lens.

8. The apparatus of claim 7 in which said reflective surface is a surface of the sensor crystal.

9. The apparatus of claim 7 in which said fiber optic cable includes two optical fibers and said fibers within said enclosure are equidistant from the optical axis of said lens.

10. The apparatus of claim 9 in which said fiber optic cable is multimodal.

11. The apparatus of claim 1 in which said sensor crystal has an absorption band edge that is temperature sensitive in the range from about −80° C. to about 200° C.

12. The apparatus of claim 1 in which said sensor crystal includes a material that absorbs incident light and produces a luminescence of wavelength that changes according to the temperature of the sensor.

13. The apparatus of claim 12 in which said luminescence is fluorescence.

14. The apparatus of claim 13 in which said sensor crystal is selected from the group consisting essentially of chromium doped beryllium aluminum oxide or chromium doped yttrium oxide single crystal material.

15. System for detecting the temperature of a high voltage conductor, which comprises:
    (a) an electrically and thermally conductive fixture for attachment to a high voltage conductor,
    (b) a high voltage insulator having a high voltage end and a reference potential end and a fiber optic cable passageway from the reference potential end to the high voltage end, said insulator being connected at said high voltage end to said fixture,
    (c) a fiber optic cable comprising optical fibers within said passageway of said insulator, said cable extending from said insulator distally to an end thereof,
    (d) an optical temperature sensor head optically coupled to said cable, said sensor head comprising a sensor crystal which transmits light in variance to temperature of the sensor crystal,
    (e) an electrically and thermally conductive enclosure for said sensor head, supported in said fixture for thermally conductive contact with said high voltage conductor effective to couple the temperature of the high voltage conductor to said sensor crystal,
    (f) a light source optically coupled to an optical fiber at said end of said fiber optical cable, for sending light through such optical fiber for transmission through said sensor crystal and return from said sensor crystal through an optical fiber in said cable, said return light carrying an optical information telling the temperature of said high voltage conductor, and
    (g) a detector optically coupled at said end of said fiber optical cable to an optical fiber carrying said return light, for receiving and converting said optical information into electronic information in another form representative of the temperature of said high voltage conductor.

16. The system of claim 15 in which said detector comprises a photodetector for converting said optical information of temperature to an electrical signal representation of said temperature of said high voltage conductor.

17. The system of claim 15 in which the detector includes a spectrometer.

18. The system of claim 15 in which the detector includes a comparator of light intensities.

19. The system of claim 15 in which said light source is an incandescent bulb coupled with a band pass filter or is a diode.

20. The system of claim 15 in which said light source is coherent.

21. The system of claim 20 in which said light source is a diode laser.

22. The system of claim 21 in which said diode laser launches light in the near infrared spectrum.

23. The system of claim 21 in which said diode laser has a coupling output of at least about 100 milliwatts.

24. The system of claim 15 in which said sensor head further comprises a gradient index lens having a focal plane adjacent said sensor crystal and another focal plane adjacent an end face of said at least one optical fiber within said enclosure.

25. The system of claim 24 in which said sensor head includes a reflective surface proximate said sensor crystal, for reflecting incident light received from said sensor crystal back through said sensor crystal.

26. The system of claim 25 in which said reflective surface is a surface of the sensor crystal.

27. The system of claim 24 in which said fiber optic cable includes two optical fibers equidistant within said enclosure from the optical axis of said lens.

28. The system of claim 15 in which said sensor crystal has an absorption band edge that is temperature sensitive in the range from about −80° C. to about 200° C.

29. The system of claim 15 in which said sensor crystal includes a material that absorbs incident light and produces a luminescence of wavelength that changes according to the temperature of the sensor.

30. The system of claim 15 further comprising a data processor for receiving and processing said information in an electronic form representative of the temperature of said high voltage conductor to determine said temperature.

31. The system of claim 30 further comprising machine readable data storage to which the data of temperature determined by the data processor are written and read, and at least one human readable output devices to which data of temperature determined by the data processor may be directed for reporting of the temperature data.

* * * * *